(12) United States Patent
Kim et al.

(10) Patent No.: US 9,135,459 B2
(45) Date of Patent: Sep. 15, 2015

(54) SECURITY MANAGEMENT UNIT, HOST CONTROLLER INTERFACE INCLUDING SAME, METHOD OPERATING HOST CONTROLLER INTERFACE, AND DEVICES INCLUDING HOST CONTROLLER INTERFACE

(71) Applicants: Kwan Ho Kim, Suwon-si (KR); Seok Min Kim, Suwon-si (KR); Heon Soo Lee, Hwaseong-si (KR)

(72) Inventors: Kwan Ho Kim, Suwon-si (KR); Seok Min Kim, Suwon-si (KR); Heon Soo Lee, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 90 days.

(21) Appl. No.: 14/017,623

(22) Filed: Sep. 4, 2013

(65) Prior Publication Data

US 2014/0115656 A1   Apr. 24, 2014

(30) Foreign Application Priority Data

Oct. 19, 2012   (KR) .......................... 10-2012-0116890

(51) Int. Cl.
*H04L 9/00*   (2006.01)
*H04L 9/32*   (2006.01)
*G06F 21/62*   (2013.01)
*G06F 21/78*   (2013.01)

(52) U.S. Cl.
CPC ................ *G06F 21/62* (2013.01); *G06F 21/78* (2013.01)

(58) Field of Classification Search
CPC ......... G06F 21/78; G06F 21/79; G06F 21/80; G06F 21/805; G06F 3/0622; G06F 3/063; G06F 21/62; H04L 63/207

USPC .............. 726/1-2, 26-30; 713/165-167, 189, 713/193; 711/100, 111
See application file for complete search history.

(56) References Cited

U.S. PATENT DOCUMENTS

| | | | |
|---|---|---|---|
| 4,713,753 A * | 12/1987 | Boebert et al. ................ | 711/164 |
| 5,787,169 A | 7/1998 | Eldridge et al. | |
| 6,421,730 B1 * | 7/2002 | Narad et al. ................... | 709/236 |
| 7,716,720 B1 * | 5/2010 | Marek et al. ....................... | 726/2 |
| 8,127,145 B2 * | 2/2012 | O'Brien et al. ............... | 713/189 |
| 8,161,524 B2 | 4/2012 | Oh et al. | |
| 8,352,999 B1 * | 1/2013 | Zhan et al. ........................ | 726/1 |
| 2009/0319741 A1 | 12/2009 | Gremaud et al. | |
| 2010/0161928 A1 | 6/2010 | Sela et al. | |

FOREIGN PATENT DOCUMENTS

| | | |
|---|---|---|
| JP | 11053263 | 2/1999 |
| JP | 2005056305 | 3/2005 |
| JP | 2008059245 | 3/2008 |
| JP | 2008090519 | 4/2008 |
| JP | 2008129803 | 6/2008 |
| JP | 2010267240 | 11/2010 |
| JP | 2011210247 | 10/2011 |
| KR | 20090093661 | 9/2009 |
| KR | 0945181 | 2/2010 |

\* cited by examiner

*Primary Examiner* — Hosuk Song
(74) *Attorney, Agent, or Firm* — Volentine & Whitt, PLLC

(57) ABSTRACT

A method of operating a host controller interface includes receiving a buffer descriptor including sector information from a main memory, fetching data by using a source address included in the buffer descriptor, selecting one of a plurality of entries included in a security policy table by using the sector information, and determining whether to encrypt the fetched data by using a security policy included in the selected entry.

23 Claims, 19 Drawing Sheets

FIG. 6

Sector Access Control Table 322A

| Base sector address register | SIZE | VALID/ INVALID | READ/ WRITE | SECURE/ NON-SECURE | ENCRYPTION/ NON-ENCRYPTION |
|---|---|---|---|---|---|
| Base sector address register 1 | A sectors | VALID | R | S | Enc |
| Base sector address register 2 | B sectors | VALID | R/W | NS | NonEnc |
| Base sector address register 3 | C sectors | VALID | R/W | S | Enc |
| Base sector address register 4 | D sectors | VALID | R | NS | Enc |
| ⋯ | | | | | |
| Base sector address register 8 | N sectors | INVALID | R | NS | Enc |

| SMU Table | | | | |
|---|---|---|---|---|
| 322B | | | | |
| Base sector address register | VALID/ INVALID | READ/ WRITE | SECURE/ NON-SECURE | ENCRYPTION/ NON-ENCRYPTION |
| Base sector address register 0 | VALID | R | S | Enc |
| Base sector address register 1 | VALID | R/W | NS | NonEnc |
| Base sector address register 2 | VALID | R/W | S | Enc |
| Base sector address register 3 | VALID | R | NS | Enc |
| ... | | | | |
| Base sector address register N | INVALID | R | NS | Enc |

| BEGIN | Beginning sector number of a partition |
|---|---|
| END | Ending sector number of a partition |
| SR | Secure Read (if 0, access is not permitted) |
| SW | Secure Write (if 0, access is not permitted) |
| NSR | Non-Secure Read (if 0, access is not permitted) |
| NSW | Non-Secure Write (if 0, access is not permitted) |
| UFK | Use Fuse Key (if 0, encryption hardware uses register key, else uses e-fuse key) |
| ECB | ECB Mode (if 0, encryption hardware operates in XTS mode) |
| ENC | Encryption Mode (if 0, sector data is accessed without encryption) |
| VAILD | Vaild Entry (if 0, the entry is invalid) |

SECURITY MANAGEMENT UNIT, HOST CONTROLLER INTERFACE INCLUDING SAME, METHOD OPERATING HOST CONTROLLER INTERFACE, AND DEVICES INCLUDING HOST CONTROLLER INTERFACE

CROSS-REFERENCE TO RELATED APPLICATIONS

A claim of priority under 35 U.S.C. §119 is made to Korean Patent Application No. 10-2012-0116890 filed Oct. 19, 2012, the subject matter of which is hereby incorporated by reference.

BACKGROUND

The inventive concept relates to host controller interfaces. More particularly, the inventive concept relates to security management units in host controller interfaces that are capable of managing a security policy according to region of a corresponding storage device. The inventive concept also relates to methods of operating a host controller interface including the security management unit, as well as devices including such host controller interfaces.

Data security is an important consideration in the design and operation of storage devices within contemporary computer systems. An effective data security approach must prevent unauthorized access to stored data, whether such access intends to read, manipulate, alter, falsify, forge, or extract the data stored. An effective data security approach must also prevent an external agent from blocking access to stored data by a legitimate user.

The data bus (and commensurate data signals communicated by the data bus) between a host controller interface and a corresponding storage device are often targeted during an on stored data. As a result, many conventional systems will encrypt the data being communicated between the host controller interface and storage device. Various encryption methods and/or encryption modules may be used in conjunction with the host controller interface for this purpose. Such conventional approaches work fairly well so long as the data security policy is applied to all of the data stored across all of the regions of the storage device.

That is, when a so-called "secure processor" is used to manage a particular data security policy for the storage device, significant overhead is encountered when data processing must be performed by a "non-secure processor". In effect, the processor switching between data having different data security polices degrades overall performance in the constituent computer system.

SUMMARY

Certain embodiments of the inventive concept provide security management units including a security policy table that may be used to differently manage security policies according to particular region of a storage device. The use of such security management units tends to minimize computational overhead within a computer system conventionally arising due to changes in the security policy. Certain embodiments of the inventive concept provide a host controller interface including this type of security management unit. Certain embodiments of the inventive concept provide methods of operating the host controller interface including this type of security management unit, as well as devices such host controller interface.

In one embodiment, the inventive concept provides a method including; receiving a buffer descriptor including sector information from a main memory, fetching data by using a source address included in the buffer descriptor, selecting an entry from a security policy table using the sector information, and determining whether to encrypt the fetched data using a security policy defined by the selected entry.

In another embodiment, the inventive concept provides a security management unit including; a security policy table stored in a memory and including first and second entries that respectively define first and second security policies for first and second regions of a storage device, and sector access control logic configured to select between the first and second entries in response to sector information included in a buffer descriptor, and provide a first control signal indicating whether to encrypt data according to the first security policy or the second security policy.

In another embodiment, the inventive concept provides a host controller interface including; a storage controller that reads data from a main memory using a source address included in a buffer descriptor and provides a sector key in response to sector information included in the buffer descriptor, a security management unit that selects an entry from a security policy table stored in a memory in response to the sector key and provides a first control signal defining a security policy corresponding to the selected entry, and a data protector that determines whether to perform an encryption operation on the data in response to the first control signal, wherein the security policy table includes a plurality of entries each respectively defining a corresponding security policy for at least one of a plurality of regions in a storage device.

In another embodiment, the inventive concept provides a computer system including a storage device that includes a plurality of regions, a central processing unit (CPU) that generates a buffer descriptor while executing an application accessing a region among the plurality of regions, a main memory that stores the buffer descriptor and data, and a host controller interface that reads the data from the main memory using a source address included in the buffer descriptor, selects one of a plurality of entries in response to sector information, and determines whether to perform an encryption operation on the data based on a security policy defined by the selected entry, wherein each of the plurality of entries manages a different security policy for each of the plurality of regions in the storage device.

BRIEF DESCRIPTION OF THE DRAWINGS

FIG. 6 is a conceptual diagram illustrating a security policy table that may be used in the security management unit of FIG. 5;

FIG. 10 is a conceptual drawings illustrating another security policy table that may be used in the security management unit of FIG. 5;

FIG. 12 is a list of signals that may be stored in a security policy table when an embedded multimedia card (eMMC) is used in an embodiment of the inventive concept;

DETAILED DESCRIPTIONS

Figure 1:
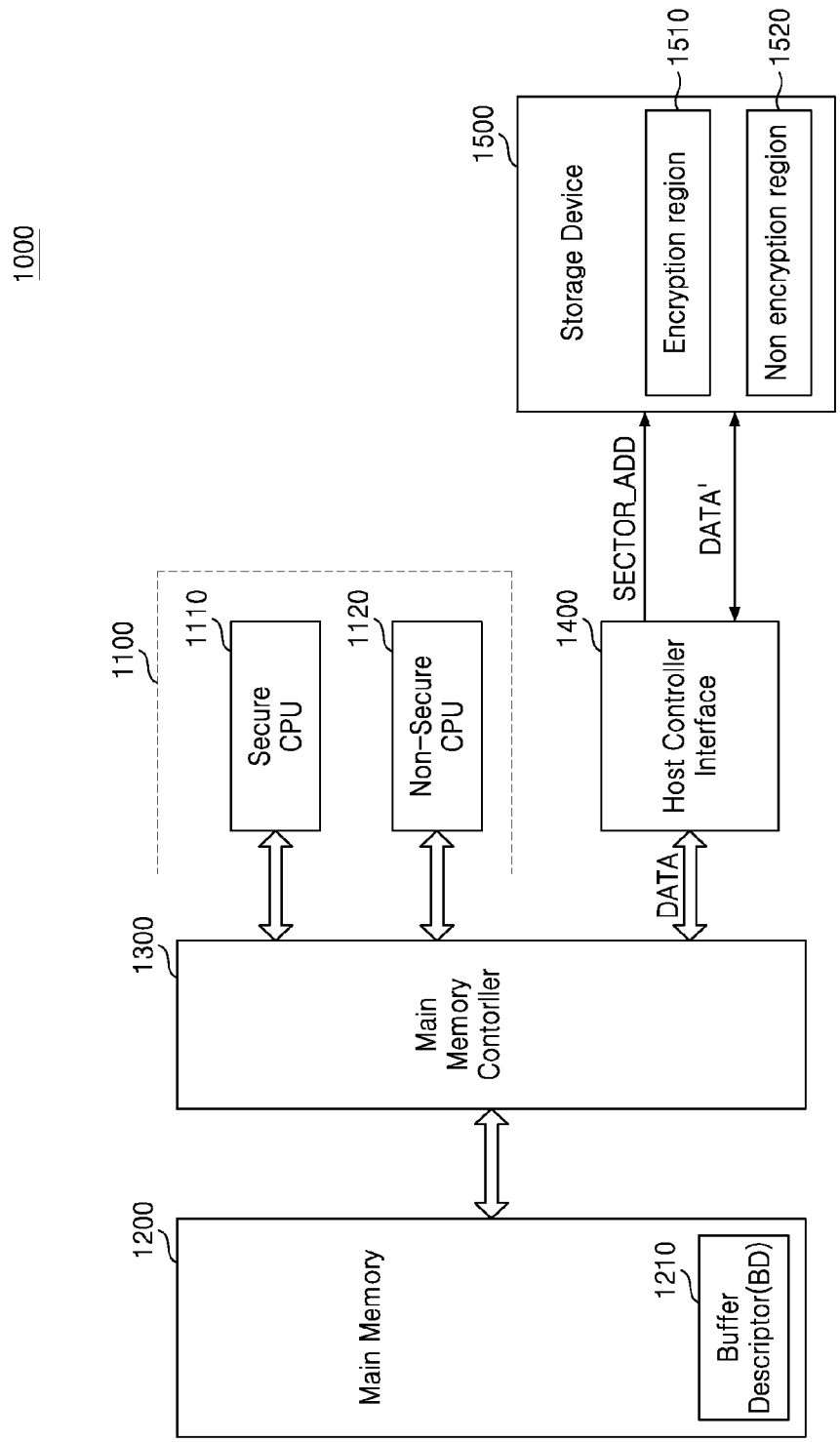
FIG. 1 is a block diagram of a computer system according to embodiments of the inventive concept.

Embodiments of the inventive concept will now be described in some additional detail with reference to the accompanying drawings. The inventive concept may, however, be embodied in many different forms and should not be construed as being limited to only the illustrated embodiments. Rather, these embodiments are provided so that this disclosure will be thorough and complete, and will fully convey the scope of the inventive concept to those skilled in the art. Throughout the written description and drawings, like reference numbers and labels denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

The term "computer system" is used herein to broadly denote a digital platform capable of performing some form of data processing on data to be stored in and/or data retrieved from a data storage device. A computer system will include logic circuitry that may generally be termed a "processor." In certain embodiments of the inventive concept, the processor of computer system may be said to "execute" one or more applications in accordance with a constituent operating system (OS).

The data (e.g., read/write data) implicated by or related to execution of an application by the processor may be stored in a "main memory". Thus, the "data" stored in the main memory may be program data defining a command within the application, and/or actual data (e.g., user data, payload data, computational data, etc.) operated upon or generated by the processor in response to command(s).

As is understood by those skilled in the art, a computer system may run more than one application in succession or simultaneously (i.e., overlapping at least in execution time). In general, data may be shared between applications, but only so long as said data possesses a "security definition" capable of being coherently understood by each application. However, certain data definitions associated with one application may not be understood by another application. For example, certain smart cards run a security application using a security key that is necessary to perform validation, authentication, and/or decryption of data. Protecting security keys and/or associated data defined in relation to a security key (collectively or individually hereafter, "security key-required data") is an important consideration in any data security approach.

Figure (FIG. 1 is a block diagram illustrating a computer system according to certain embodiments of the inventive concept. Referring to FIG. 1, a computer system 1000 comprises a central processing unit (CPU) 1100, a main memory 1200, a main memory controller 1300, a host controller interface 1400, and a data storage device 1500. The computer system 1000 may be a mobile device such as a mobile phone or a laptop computer, a personal computer, a server computer, programmable home appliances, or an all-purpose or specific-purpose computer system such as a main frame computer.

The CPU 1100 controls the overall operation of the computer system 1000, and in the illustrated embodiment of FIG. 1 includes a secure CPU 1110 and a non-secure CPU 1120. The secure CPU 1110 may be used to execute computer system booting operations and certain authentication process(es). In contrast, the non-secure CPU 1120 is not allowed to access a security module, or data stored in an "encrypted data region."

For example, it is assumed that the computer system 1000 is a mobile device capable of executing an application requiring a high level of data security (e.g., a banking application or a stock brokerage application). This type of "high security application" is one that requires data certification or authentication, and as such, must be executed by secure CPU 1110. However, the computer system 1000 may also be capable of executing multiple "low security applications" (e.g., an e-book or game application) using the non-secure CPU 1120.

Accordingly, when a "current application" (i.e., an application currently being executed by CPU 1100) accesses data stored in the storage device 1500, the CPU 1100 may generate a "buffer descriptor" (BD) identifying a stored location for associated data (e.g., read/write data), and then store the buffer descriptor along with the data in main memory 1200, albeit, each generated buffer descriptor may be stored in a particular buffer descriptor (BD) region 1210 of the main memory 1200. In this context, the main memory 1200 may be understood as data storage media that is used to temporarily store data (e.g., a system memory or cache memory). Hence, the main memory 1200 may be used to store data according to a file system form, and/or to store buffer descriptor(s) generated by the CPU 1100 in the BD region 1210.

In conjunction with the CPU 1100, the main memory controller 1300 may be used to control the main memory 1200. The main memory controller 1300 may be configured to support a plurality of bus interface ports, and thereby the main memory controller 1300 may be connected to the secure CPU 1110, the non-secure CPU 1120, and the host controller interface 1400.

The host controller interface 1400 provides a hardware-based interface capable of communicating data (e.g., DATA and DATA') between the main memory 1200 and storage device 1500. In certain embodiments of the inventive concept, the host controller interface 1400 may provide a direct memory access (DMA) master function. A host controller interface 1400 having the DMA master function may be used to generate a "secure transaction" having a given "security definition" or "security level" as established by the secure CPU 1110. It may also be used to generate a "non-secure transaction" having no particular security level (or a relatively low security level) as established by the non-secure CPU 1120. According to certain embodiments of the inventive concept, the host controller interface 1400 and the storage device 1500 may communicate using a serial ATA (SATA) interface, and a sector may be used as an address unit.

The storage device 1500 is assumed to be data storage media capable of long-term (nonvolatile) storage of large amounts of data (e.g., software, user data, etc.). As shown in FIG. 1, the storage device 1500 may include an encryption region 1510 provided to store security-required data and a non-encryption region 1520 provided to store general data, or non-security-required data. Only high security applications generating and accessing security-required data from the encryption region 1510 may access the encryption region 1510.

Figure 2:
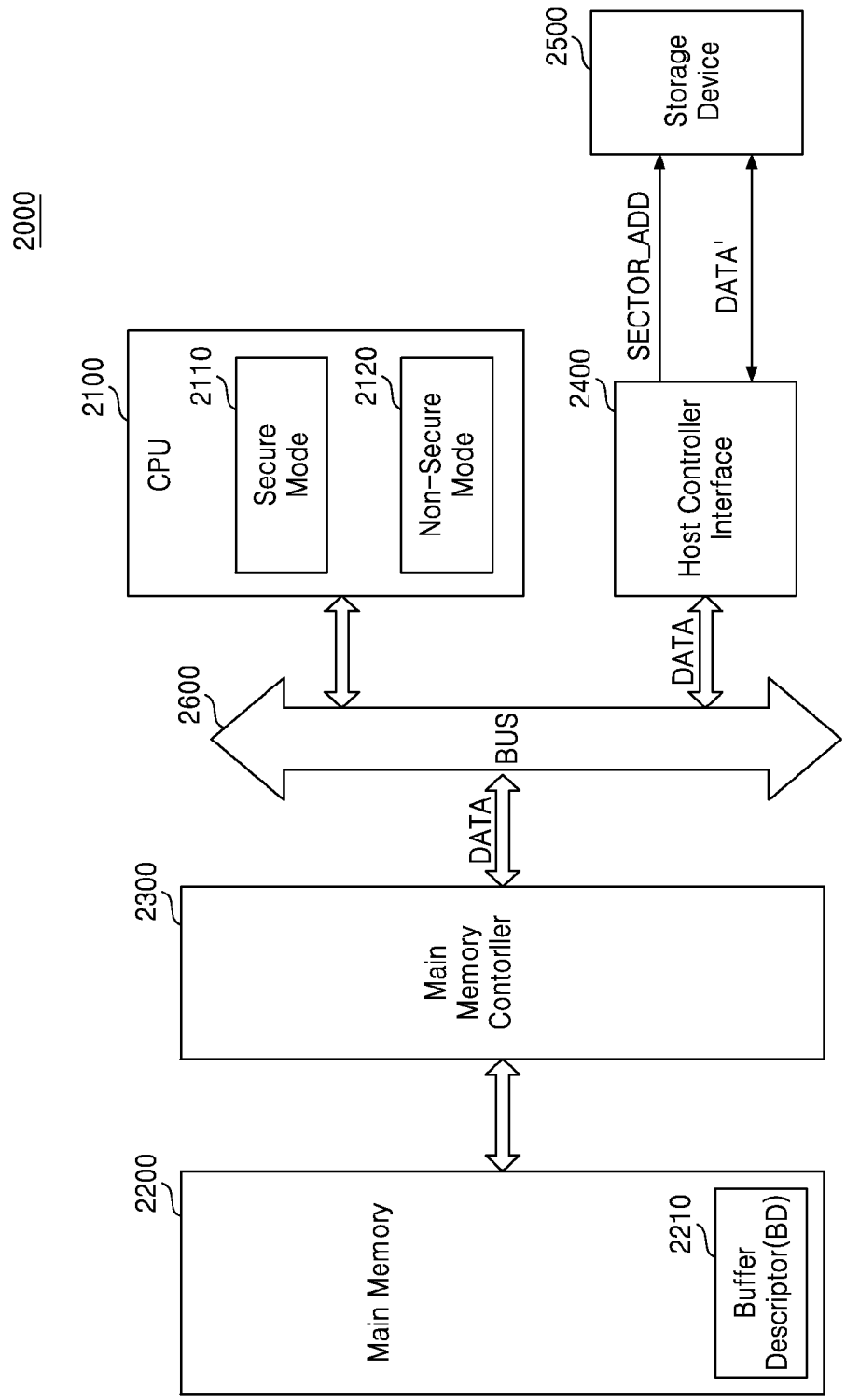
FIG. 2 is a block diagram of a computer system according to another embodiment of the inventive concept.

FIG. 2 is a block diagram illustrating a computer system according to certain embodiments of the inventive concept. Referring to FIG. 2, a computer system 2000 comprises a CPU 2100, a main memory 2200, a main memory controller 2300, a host controller interface 2400, and a storage device 2500. The CPU 2100, main memory 2200, main memory controller 2300, and host controller interface 2400 communicate via a system bus 2600.

Compared to the computer system 1000 of FIG. 1, the memory controller 2300 in the computer system 2000 of FIG. 2 is assumed to support only a single bus interface port. Accordingly, the CPU 2100 may be electrically connected to either the memory controller 2300 or the host controller interface 2400 via the system bus 2600 at any given point in time.

The CPU 2100 may operate in either a secure mode 2110 or a non-secure mode 2120. Each one of these operating modes may be determined according to a current application being executed by the CPU 2100. When the CPU 2100 operates in the non-secure mode 2120 in response to a low security application, it may not simultaneously access a security module or an encrypted memory region.

The structure and operation of the host controller interface 2400 of FIG. 2 may be substantially similar to that of the host interface 1400 of FIG. 1.

Figure 3:
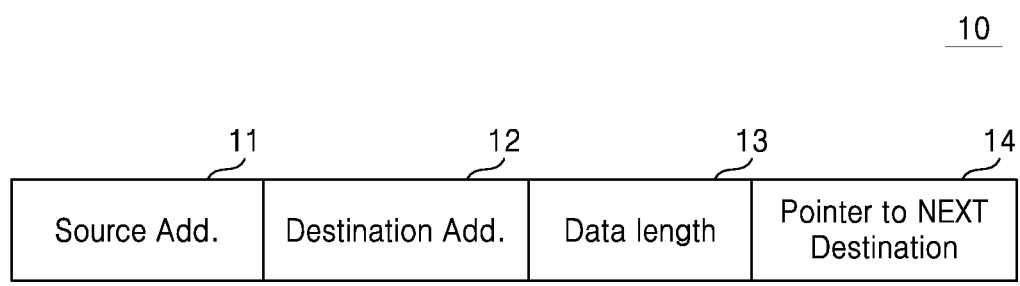
FIG. 3 is a conceptual diagram showing one example of a buffer descriptor that may be used in the computer systems of FIGS. 1 and 2.

FIG. 3 is a conceptual diagram illustrating one possible data structure for a buffer descriptor that may be used in an embodiment of the inventive concept. Referring to FIGS. 1, 2 and 3, a buffer descriptor 10 includes a source address 11, a destination address 12, a data length 13, and a pointer to NEXT destination 14.

The source address 11 indicates a location at which source data (i.e., data to be processed) is stored. The destination address 12 indicates a location at which resultant data (i.e., the subsequently processed data) is stored. The data length 13 indicates a size of data to be communicated, and the pointer to NEXT destination 14 indicates the location of a next memory access operation following the current memory access operation.

During a read operation, the CPU 1100/2100 generates a buffer descriptor 10 associated with read data (DATA') stored in the storage device 1500/2500. Here, the source address 11 of the buffer descriptor 10 may include an address of the storage device 1500 or 2500, and the destination address 12 may include the main memory 1200 or 2200.

During a write operation, the CPU 1100/2100 generates the buffer descriptor 10 associated with write data (DATA) temporarily stored in the main memory 1200/2200 and to be programmed to the storage device 1500/2500. Here, the source address 11 of the buffer descriptor 10 may be an address in the main memory 1200/2200, while the destination address 12 may be an address in the storage device 1500/2500.

Hereafter, exemplary structures and operations for certain host controller interfaces 1400/2400 will be described in some additional detail with reference to FIGS. 5, 15, 16, and 17.

Figure 4:
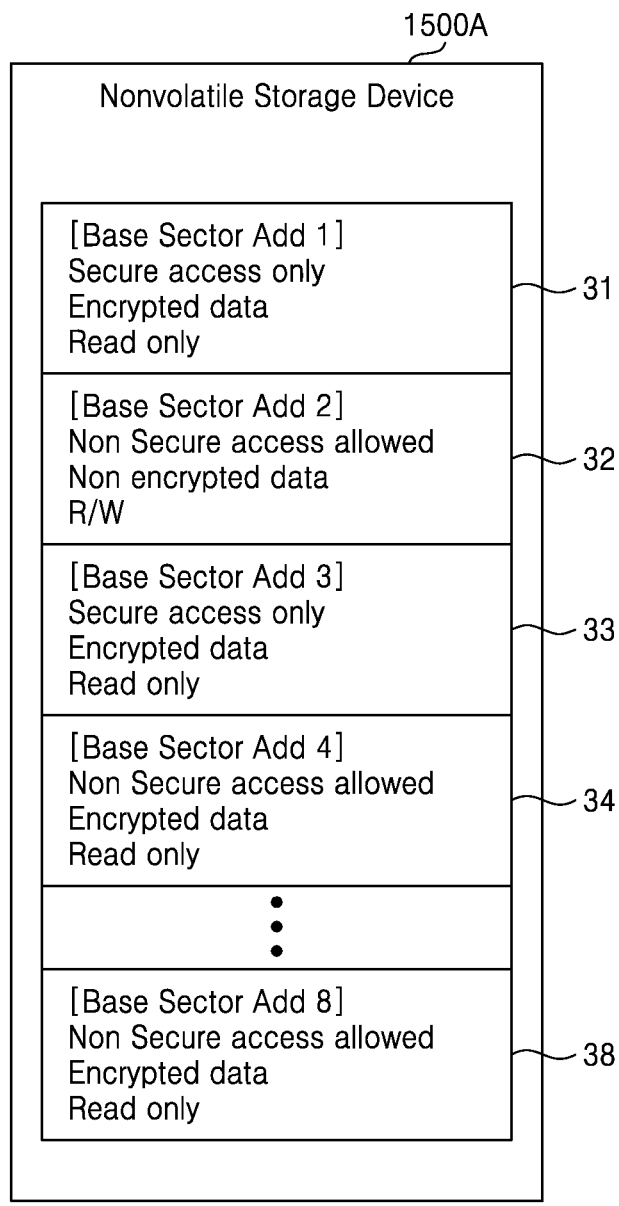
FIG. 4 is a block diagram of a partial memory map for the storage device of FIG. 1.

FIG. 4 is a block diagram illustrating one possible example (1500A) of a partial memory map for the storage device 1500 of FIG. 1. The storage device 1500A may be embodied in a magnetic storage device like a hard disk drive (HDD), an optical storage disk such as a compact disk (CD), or a flash-based memory such as a solid state drive (SSD), a multimedia card (MMC), embedded MMC (eMMC) or a universal flash storage (UFS).

Assuming a HDD is used, information may be stored on a magnetic disc rotating at high speed. Data may be read from and/or written to the magnetic disc using one or more read/write heads. Compared with HDDs, conventional SSDs performs relatively high speed read operations, but relatively low speed write operations.

The MMC is a detachable or attachable device storing and moving data of various digital devices such as a cellular phone, a smart phone, mobile internet device (MID), a computer, or a digital camera, and is configured by a storage space for storing data and a portion in charge of an operation and a control.

The UFS is a flash-based storage device having low power consumption. The UFS may be used as a high speed serial interface while having a storage capability like SSD, build-in a command queuing function for improving a random access function, and build-in a power-saving function of a serial interface.

In general, the storage device 1500 may have an address unit of CHS (cylinder, head, and sector) or a logical block address (LBA). The LBA is used to designate a location of a data block in the storage device 1500. The LBA may designate an address or a block (i.e., index). Sector and logical blocks may be an integer multiple of 512 bytes like 512 bytes or 1024 bytes.

Referring to FIG. 4, the storage device 1500A includes a plurality of regions 31 to 34 and 38 each respectively capable of storing data having a different security definition (or security policy). According to a type of the storage device, each of the plurality of regions may be divided into a segment unit, a sector unit, or a partition unit.

A particular security policy may be determined during DMA operation according to a prescribed security level for the current application. Thus, the security policy of the current application determines whether access to a specific region is available, whether data stored in the specific region is encrypted, and whether a write operation is available, for example.

Thus, in the illustrated example of FIG. 4, a first region 31 may be accessed by only secure applications having a particular security policy. Hence, first region 31 stores only encrypted data, and only read operations is allowed for the encrypted data stored in the first region 31. A third region 33 is similarly defined.

However, a second region 32 may be accessed by non-secure applications, is capable of storing only plain text (non-encrypted) data, and both read and write operations are allowed.

A fourth region 34 may be accessed by non-secure applications, is capable of storing encrypted data, and only read operations are allowed, and an eighth region 38 is similarly defined.

Figure 5:
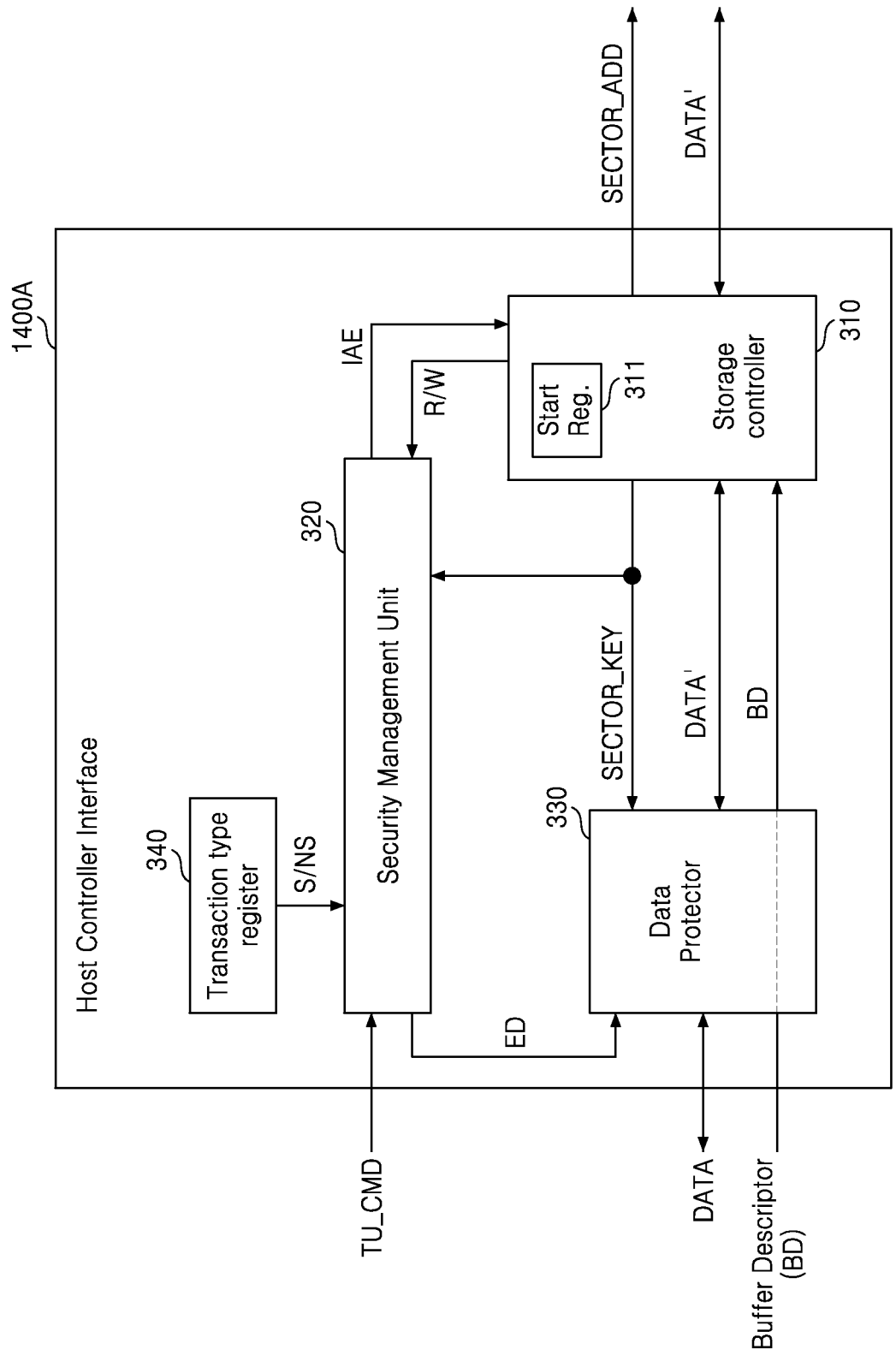
FIG. 5 is a block diagram illustrating a host controller interface that may be used in the computer system of FIGS. 1 and 2.

FIG. 5 is a block diagram further illustrating one possible example of a host controller interface that may be used in the computer system of FIG. 1. Referring to FIGS. 1 and 5, a host controller interface 1400A comprises a storage controller 310, a security management unit 320, a data protector 330, and a transaction type register 340.

The storage controller 310 controls data access operations directed to data stored in the storage device 1500. When data are stored in the storage device 1500 is identified by sector, the conventionally understood XTS-AES method of allocating a sector key to each sector may be used as one approach to the encryption of the data stored in the storage device 1500.

In the illustrated example of FIG. 5, the storage controller 310 receives a buffer descriptor (BD) from the main memory 1200. The storage controller 310 may then (e.g.,) use a source address included the buffer descriptor to identify particular data (DATA) stored in the main memory 1200.

In addition, the storage controller 310 provide a sector key (SECTOR_KEY) to the data protector 330 in accordance with sector information included in the buffer descriptor BD. The sector information included in the buffer descriptor BD may be used by the storage controller 310 as information generating a corresponding sector address (SECTOR_ADD) that is communicated to the storage device 1500. Here, one sector key may be uniquely generated from sector information regardless of how the storage controller 310 subsequently uses the sector information during data processing operations.

In certain embodiments of the inventive concept, the security management unit 320 includes a security policy table having multiple entries, each entry managing a security policy for a particular region of the storage device 1500. One possible example of a security policy table will be described in some additional detail with reference to FIG. 6.

Accordingly, the security management unit 320 may select one of the security policy table entries in response to a given the sector key (SECTOR_KEY) provided by the storage controller 310. The security management unit 320 may output an encryption/decryption indication signal ED, determining whether to perform an encryption operation on data according to a security policy included in the selected entry, to the data protector 330. Further, the security management unit 320 may output an access indication signal IAE, determining whether to allow an access operation (e.g., a read/write operation) according to the security policy indicated by the selected entry. That is, the read/write signal (R/W) provided by the storage controller 310 is interrupted by the security management unit 320 in accordance with the access indication signal IAE.

In response to the encryption/decryption indication signal ED provided by the security management unit 320, the data protector 330 may be used to perform encryption/decryption operation(s) on write data (DATA) to be written to the storage device 1500 and read data (DATA') retrieved from the storage device 1500 via the host controller interface 1400A. For example, the data protector 330 may determine whether to perform an encryption operation, a decryption operation, or a bypass operation for read/write data based on an encryption/decryption indication signal ED.

When an encryption operation is performed on write data (DATA), the data protector 330 may perform an encryption operation using the sector key (SECTOR_KEY) provided by the storage controller 310.

The transaction type register 340 may be used to store security level information associated with the current application in accordance (e.g.,) with the received buffer descriptor BD. That is, the transaction type register 340 may store state information indicating whether a DMA operation performed in the host controller interface 1400A is a secure transaction type having a given security level, or a non-secure transaction type. A security level signal (S/NS) according to each transaction type is communicated to the security management unit 320. Here, it is assumed that the respective operation of the security management unit 320 and data protector 330, as well as the information stored in the transaction type register 340 may be changed by only the security CPU 1110.

FIG. 6 is a conceptual drawing illustrating one possible example of a security policy table that may be included in the security management unit of FIG. 5.

Referring to FIG. 6, a security policy table 322A includes multiple entries, each entry managing a particular security policy for one or more regions (e.g., sectors) of the storage device 1500.

The security policy table 322A of FIG. 6 only includes eight (8) entries 41 to 44 and 48. Each one of the entries 41 to 44 and 48 sets a sector address stored in a base sector address register as a start address so as to express each range of the regions included in the storage device 1500, and set a size of each region. Here, the size (SIZE) of each region corresponding to each entry 41 to 44 and 48 may be equally or differently set.

In each one of the entries 41 to 44 and 48, includes information indicating whether the stored data is valid or invalid (VALID/INVALID) in view of the security policy. The security policy may further indicate whether read (R) and/or write (W) access is allowed for a particular region of the storage device 1500. The security policy may further indicate whether to allow an access on a secure (S) or non-secure (NS) basis for a particular region of the storage device 1500. Finally, the security policy may indicate whether an encryption (Enc) operation may be performed in relation to data written to or read from the region.

In the illustrated example of FIG. 6, it is assumed that the data stored in the regions (sectors) associated with entries 41 to 44 are VALID.

A first region has a size of A sectors from an address stored in Base sector address register 1. Only a read operation may be performed in the first region, the first region may be accessed only by an application having a security level, and encrypted data may be stored in the first region.

A second region has a size of B sectors from an address stored in Base sector address register 2. Both a read and write operations may be performed in the second region, the second region may be accessed not only by an application having a security level but also by an application having a non-security level, and non-encrypted data (NonEnc) may be stored in the second region.

A third region has a size of C sectors from an address stored in Base sector address register 3. Both a read and write operations may be performed in the third region, the third region may be accessed only by an application having a security level, and encrypted data may be stored in the third region.

A fourth region has a size of D sectors from an address stored in Base sector address register 4. Only a read operation may be performed in the fourth region, the fourth region may be accessed not only by an application having a security level, but also by an application having a non-security level, and encrypted data may be stored in the fourth region.

In contrast to the foregoing, the data stored in a fifth region associated with the eighth entry 48 is invalid.

Different control methods may be used to establish a particular security policy (and corresponding entry in the security policy table 322A) according to certain embodiments of the inventive concept.

Figure 7:
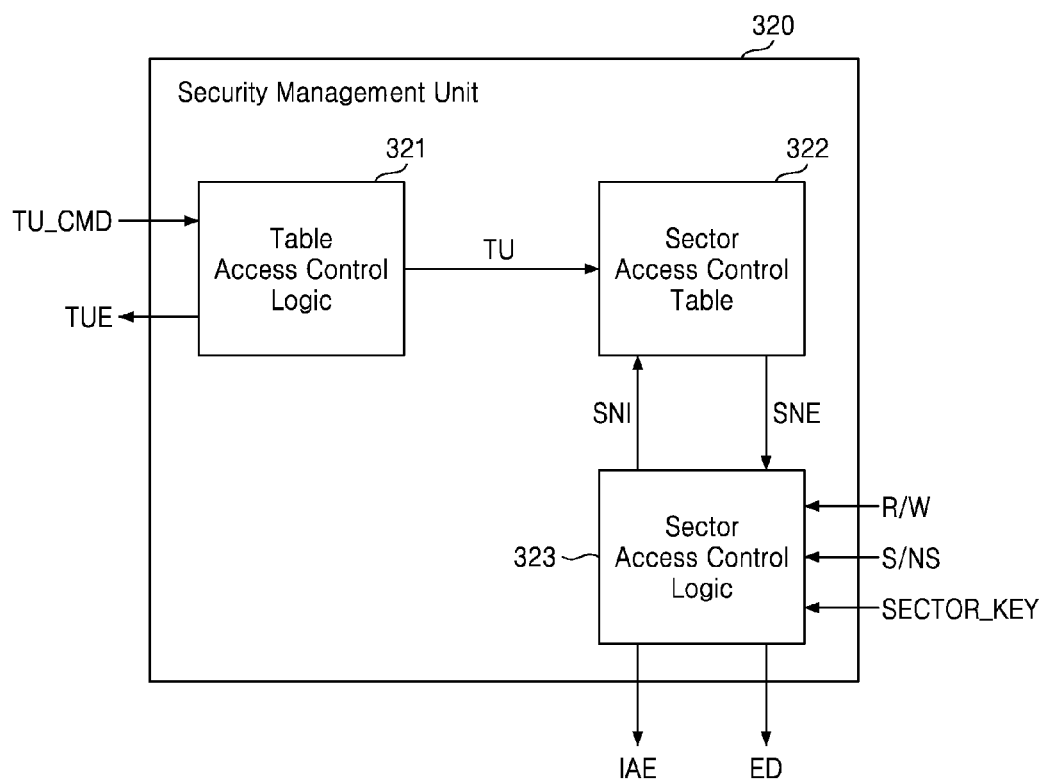
FIG. 7 is a block diagram further illustrating the security management unit of FIG. 5.

FIG. 7 is a block diagram further illustrating the security management unit 320 of FIG. 5. Referring collectively to FIGS. 1, 5, 6, and 7, the security management unit 320 comprises a table access control logic 321, a sector access control table 322, and a sector access control logic 323. The security policy table 322A illustrated in FIG. 6 is one example of the sector access control table 322.

The table access control logic 321 may change a security policy in each region of the storage device 150 stored in the sector access control table 322 in response to a table-update command TU_CMD output from the secure CPU 1110. When the table-update command TU_CMD is input from the non-secure CPU 1120, the table access control logic 321 does not transmit a security policy change signal TU to the sector access control table 322, but transmits an error signal TUE to the non-secure CPU 1120.

The table access control logic 321 may generate a security policy change signal TU for changing at least one entry of the sector access control table 322 in response to a table-update command TU_CMD output from the secure CPU 1110.

Thus, a sector access control table also referred to as the security policy table 322 may include multiple entries, each entry managing a security policy for one or more regions of the storage device 1500. For example, the sector access control logic 323 of FIG. 7 may be used to receive a sector key (SECTOR_KEY) and an access operation signal (R/W) from the storage controller 310, and a security level signal (S/NS) from the transaction type register 340.

The sector access control logic 323 may then communicate entry selection information (SNI) for selecting one of a plurality of base sector address registers in response to a sector key to the security policy table 322. The security policy table 322 communicates a selection entry (SNE) corresponding to the selected base sector address register in response to entry selection information to the sector access control logic 323.

That is, the sector access control logic 323 may select one of entries of the security policy table 322 based on a sector key. The sector access control logic 323 may output an encryption/decryption indication signal (ED), indicating whether data are encrypted according to a security policy included in the selected entry (SNE), to the data protector 330, and output an access indication signal (IAE) to the storage controller 310.

The storage controller 310 may output a sector address (SECTOR_ADD) and the encrypted data (DATA') to the storage device 1500 in response to the access indication signal IAE. The storage device 1500 may store the encrypted data (DATA') in a region corresponding to the sector address. In this case, the sector address may include at least one of the destination address 12 and the data length 13.

Figure 8:
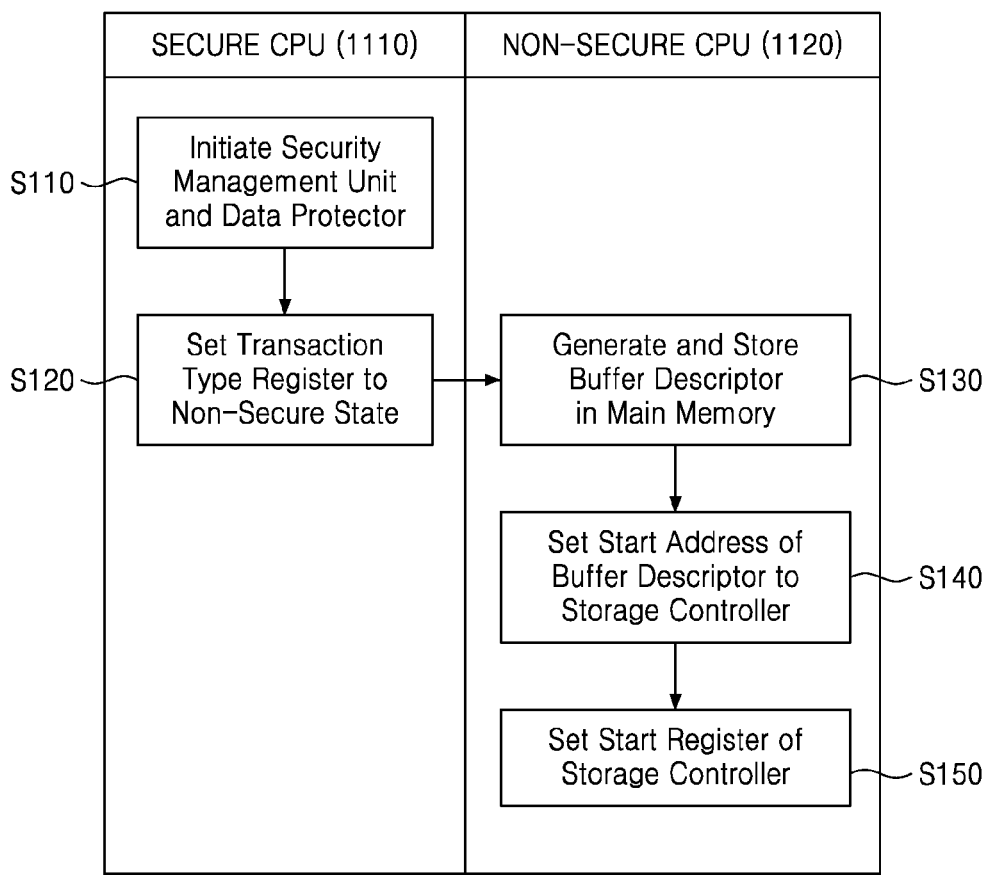
FIG. 8 is an operating diagram illustrating an initialization operation for a direct memory access operation according to embodiments of the inventive concept.

FIG. 8 is an operating diagram illustrating an initiation operation that may be performed during a DMA operation according to certain embodiments of the inventive concept. Referring to FIGS. 1, 5, and 8, the secure CPU 1110 initiates the security management unit 320 and data protector 330 (S110).

Afterwards, the secure CPU 1110 sets the transaction type register 340 in a non-secure state, so that the non-secure CPU 1120 is executed (S120). When the non-secure CPU 1120 operates an application, the non-secure CPU 1120 generates a buffer descriptor BD, and the generated buffer descriptor BD is stored in the storage region 1210 of the main memory 1200 through the main memory controller 1300.

When a start address of the buffer descriptor BD points the storage controller 310 (S140), the start address is stored in the start register 311 (S150). Afterwards, a DMA operation may be started based on the start address stored in the start register 311 of the storage controller 310.

Figure 9A:
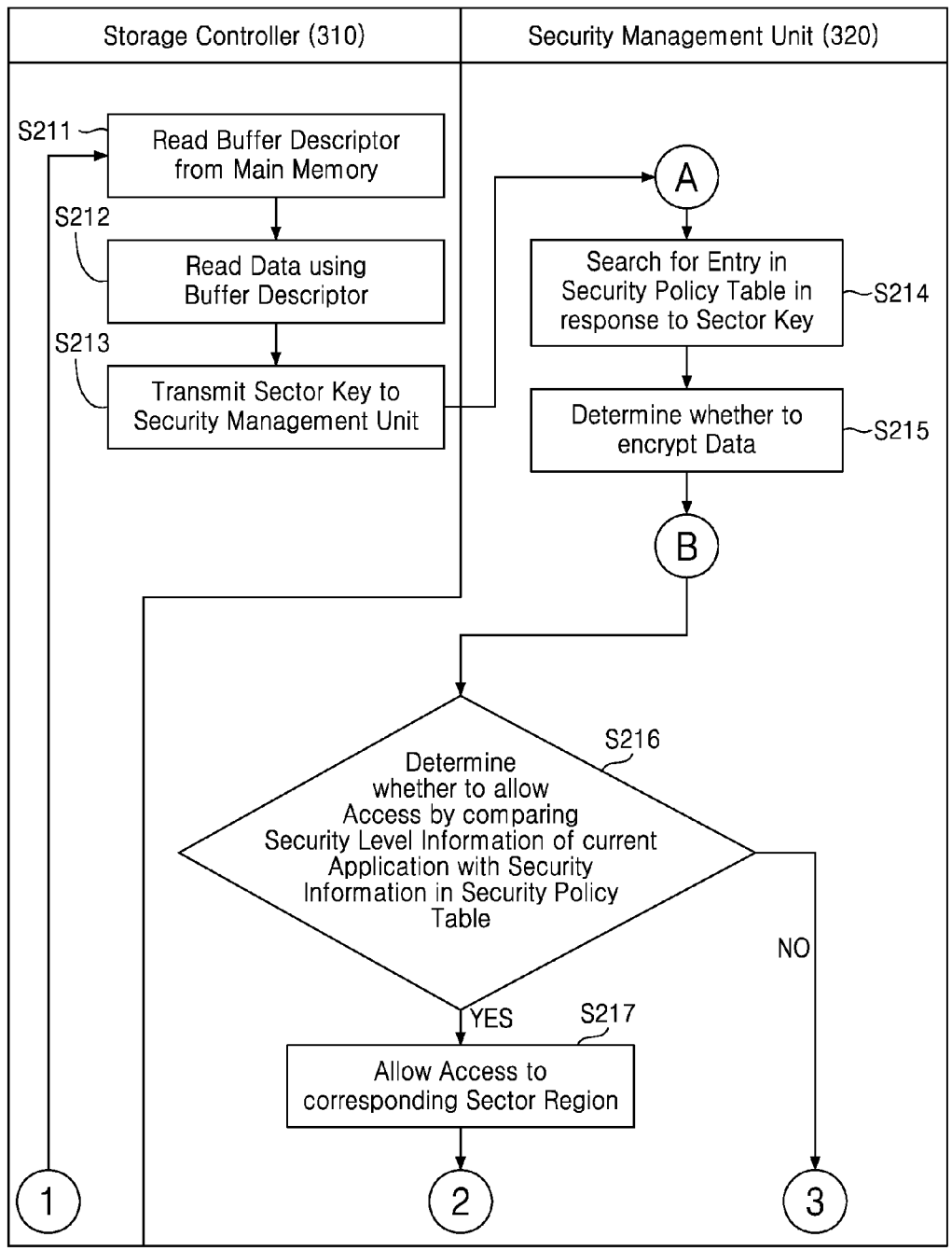
FIG. 9, inclusive of FIGS. 9A and 9B, is a flowchart illustrating an operating method for direct memory access operation according to embodiments of the inventive concept.
Figure 9B:
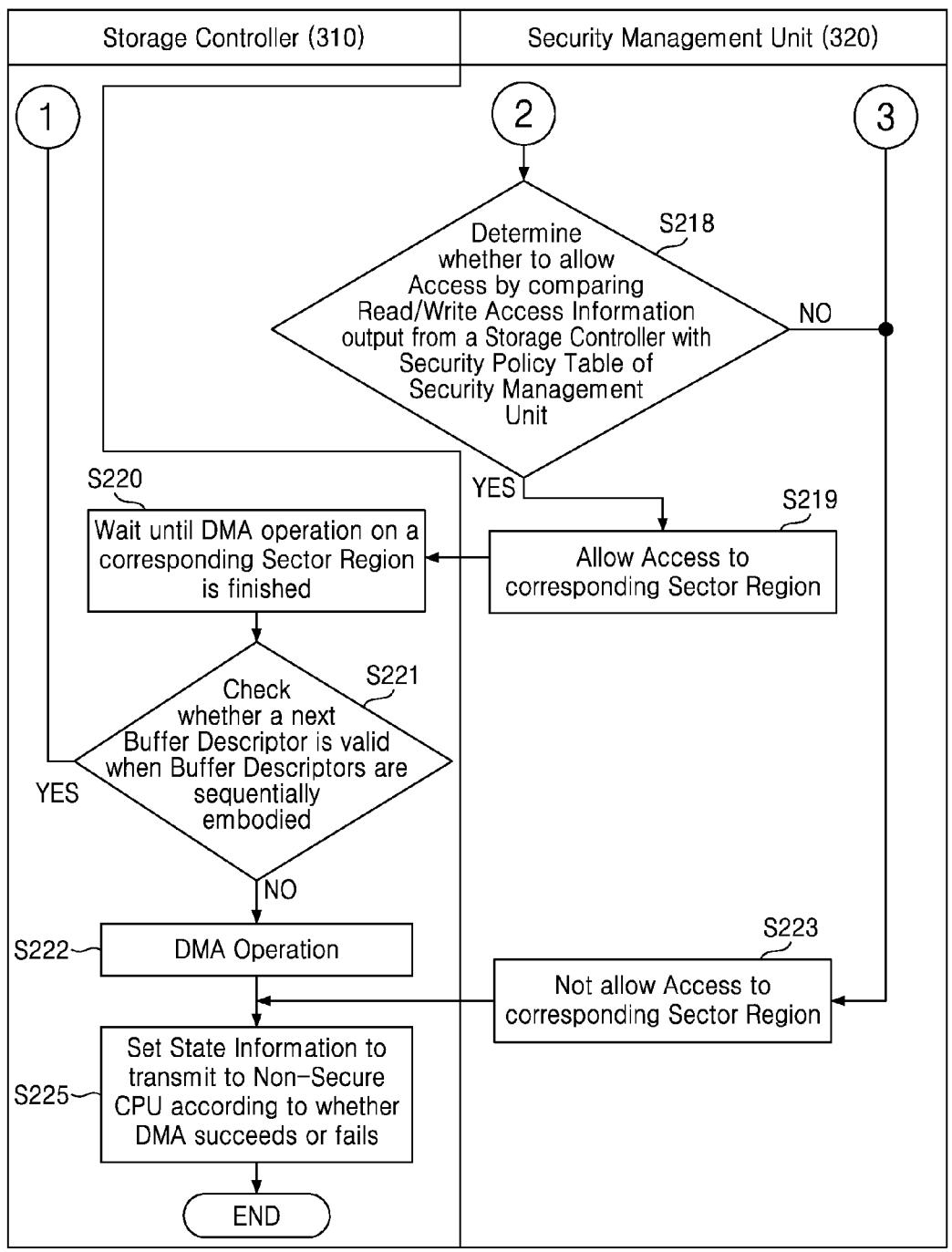

FIG. 9, inclusive of FIGS. 9A and 9B, is a flowchart summarizing an operating method, whereby a Direct Memory Access (DMA) operation may be performed according to embodiments of the inventive concept.

Referring to FIGS. 1, 5, 9A, and 9B, the storage controller 310 reads a buffer descriptor BD including sector information from the storage region 1210 of the main memory 1200 by using a start address stored in the start register 311 (S211). Here, the buffer descriptor (BD) is generated by an application for accessing a specific region of the storage device 1500 corresponding to the sector information. The buffer descriptor is input to the storage controller 310 through the data protector 330.

The storage controller 310 reads or fetches data (DATA) stored in the main memory 1200, e.g., a storage region corresponding to the source address, by using a source address (e.g., 11 of FIG. 3) included in the buffer descriptor (S212).

The storage controller 310 generates a sector key (SECTOR_KEY) based on sector information included in the buffer descriptor BD, and transmits the sector key to the security management unit 320 and the data protector 330 (S213).

The security management unit 320 selects one of a plurality of entries included in the security policy table 322 in response to a sector key output from the storage controller 310 (S214). Here, the security policy table 322 includes entries each managing a security policy for each of the regions included in the storage device 1500.

The security management unit 320 determines whether the fetched data is encrypted using the security policy included in the selected entry (S215). When an encryption operation needs to be performed on the fetched data, the data protector 330 may encrypt data using the sector key, for example. However, when an encryption operation does not need to be performed on the fetched data, the data protector 330 bypasses and transmits the data to the storage controller 310.

As a first determination step for determining whether to write data in a specific region of the storage device 1500, the security management unit 320 compares security level information included in the selected entry with security level information of an application (S216). Here, the security level information of the application is stored in the transaction type register 340 and transmitted to the security management 320 as a security level signal (S/NS).

The security management unit 320 may allow an access of an application to a corresponding region, e.g., a corresponding sector region, of the storage device 1500 when security level information (e.g., S or NS of FIG. 6) included in a security policy table (e.g., 322A of FIG. 6) is equal to security level information of the application (S217).

However, the security management unit 320 does not allow an access of an application to a corresponding region, e.g., a corresponding sector region, of the storage device 1500 when the security level information included in the security policy table is not equal to the security level information of the application (S223).

As a second determination step for determining whether to write data in a specific region of the storage device 1500, the security management unit 320 compares access operation information included in the selected entry with input/output operation information of the data (S218). Here the input/output operation information of the data is transmitted to the security management unit 320 as an access operation signal (R/W) from the storage controller 310.

The security management unit 320 may allow an access of an application to a corresponding region, e.g., a corresponding sector region, of the storage device 1500 when access operation information included in a security policy table is equal to input/output operation information for the data (S219).

However, the security management unit 320 does not allow an access of an application to a corresponding region, e.g., a corresponding sector region, of the storage device 1500 when access operation information included in the security policy table is not equal to input/output operation information of the data (S223).

FIG. 9 illustrates just one example in which each determination step S216 and S218 sequentially proceeds; however, a data encryption operation step S215, a first determination step S216, and a second determination step S218 may proceed independently or at least two steps proceed at the same time.

When a data access to a specific region of the storage device 1500 is allowed, a direct memory access (DMA) operation is executed. The storage controller 310 waits for completion of the DMA operation to a specific region of the storage device 1500 (S220).

When the DMA operation is completed and a buffer descriptor is sequentially embodied, the storage controller 310 checks whether a next buffer descriptor is valid (S221). When the next buffer descriptor is valid, the storage controller 310 returns to a step of reading the next buffer descriptor from the main memory 1200 (S211). However, when a next buffer descriptor is not present or not valid, the storage controller 310 completes the DMA operation (S222).

The storage controller 310 generates state information of a case when the DMA operation is successfully completed or the DMA operation fails due to failure to access a corresponding sector region, a non-secure CPU 1120 receives the state information from the storage controller 310 (S225).

Figure 11:
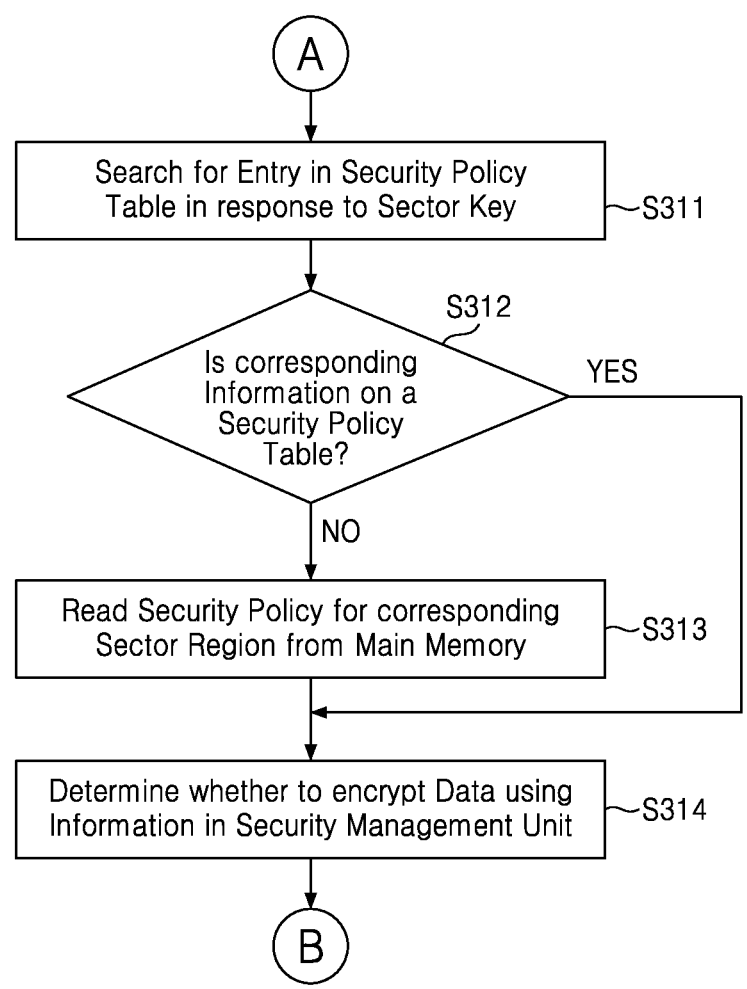
FIG. 11 is a partial flowchart further illustrating a portion of the direct memory access operation of FIG. 9 as modified by the security policy table of FIG. 10.

FIG. 10 is a conceptual diagram illustrating another example of a security policy table that may be used in relation to certain embodiments of the inventive concept, and FIG. 11 is a flowchart summarizing an operating method associated with the security policy table of FIG. 10.

When the storage device 1500 includes many regions with many corresponding entries in the security management unit 320, hardware resources may be increasingly consumed. When a security policy table including all entries is stored in the main memory 1200 and a table in the security management unit 320 operates like a translation look-a-side buffer (TLB), hardware consumption may be decreased.

The security policy table included in the security management unit of FIG. 5. Referring to FIG. 10, a security policy table 322B includes entries 51 to 55 each managing a security policy for each of the regions included in the storage device 1500.

The number of entries included in a security policy table 322B may be variously set, and a size of s region of the storage device 1500 corresponding to each entry may be equally set. According to an example embodiment of the present inventive concepts, a virtual address is stored in the security policy table 322B, and the virtual address may not be in accord with a physical address.

In each entry 51 to 55, information on whether a value stored in each entry 51 to 55 of the security policy table 322B is valid or invalid VALID/INVALID, and a security policy are stored.

The security policy may include at least one of whether to allow an access READ/WRITE to each region of the storage device 1500, which is corresponding to each entry 51 to 55, by a read operation and a write operation, whether to allow an access SECURE/NON-SECURE to the each region according to a security level, and whether to perform an encryption operation ENCRYPTION/NON-ENCRYPTION on input/output data for the each region.

For example, since validity VALID/INVALID of a first entry 51 is valid VALID, values stored in the first entry 51 corresponding to a first region of the storage device 1500 are valid. Only a read operation R may be performed in the first region, the first region may be accessed only by an application having a security level S, and encrypted data may be stored in the first region.

Since validity VALID/INVALID of a second entry 52 is valid VALID, values stored in the second entry 52 corresponding to a second region of the storage device 1500 are valid. Both a read operation and a write operation R/W may be performed in the second region, the second region may be accessed not only by an application having a security level S, but also by a application having a non-security level NS, and non-encrypted data NonEnc may be stored in the second region.

Since validity VALID/INVALID of a third entry 53 is valid VALID, values stored in the third entry 53 corresponding to a third region of the storage device 1500 are valid. Both a read operation and a write operation R/W may be performed in the third region, the third region may be accessed only by an application having a security level S, and encrypted data Enc may be stored in the third region.

Since validity VALID/INVALID of a fourth entry 54 is valid VALID, values stored in the fourth entry 54 corresponding to a fourth region of the storage device 1500 are valid. Only a read operation R may be performed in the fourth region, the fourth region may also be accessed by an application having a non-security level NS, and encrypted data Enc may be stored in the fourth region.

Since validity VALID/INVALID of a last entry 55 is invalid INVALID, values stored in the last entry 55 corresponding to a last region of the storage device 1500 are invalid. A method of setting a region in the security policy table 322B and a type of security policy described may be variously changed.

FIG. 11 is a partial flowchart summarizing a DMA operation performed in accordance with the security policy table of FIG. 10. The method steps of FIG. 11 may replace those between indicated nodes A and B in FIG. 9.

Referring to FIGS. 1, 5, 9, 10, and 11, the security management unit 320 selects or searches for one of entries included in the security policy table 322B in response to a sector key SECTOR_KEY output from the storage controller 310 (S311). Here, the security policy table 322B includes entries each managing a security policy for each of the regions included in the storage device 1500.

The security management unit 320 determines whether an entry corresponding to a sector key (SECTOR_KEY) is included in the security policy table 322B (S312).

When the security policy table 322B does not include the selected entry (S312), the storage controller 310 loads a security policy table stored in the main memory 1200 to the security management unit 320, and the security management unit 320 reads a security policy for a corresponding entry from the corresponding loaded security policy table (S313).

When the security policy table 322B includes the selected entry, it is determined whether to encrypt the fetched data by using the security policy included in the selected entry (S315).

When an encryption operation needs to be performed on the fetched data, the data protector 330 may encrypt data by using the sector key. However, when the encryption operation does not need to be performed on the data, the data protector 330 bypasses and transmits the data to the storage controller 310.

Figure 13:
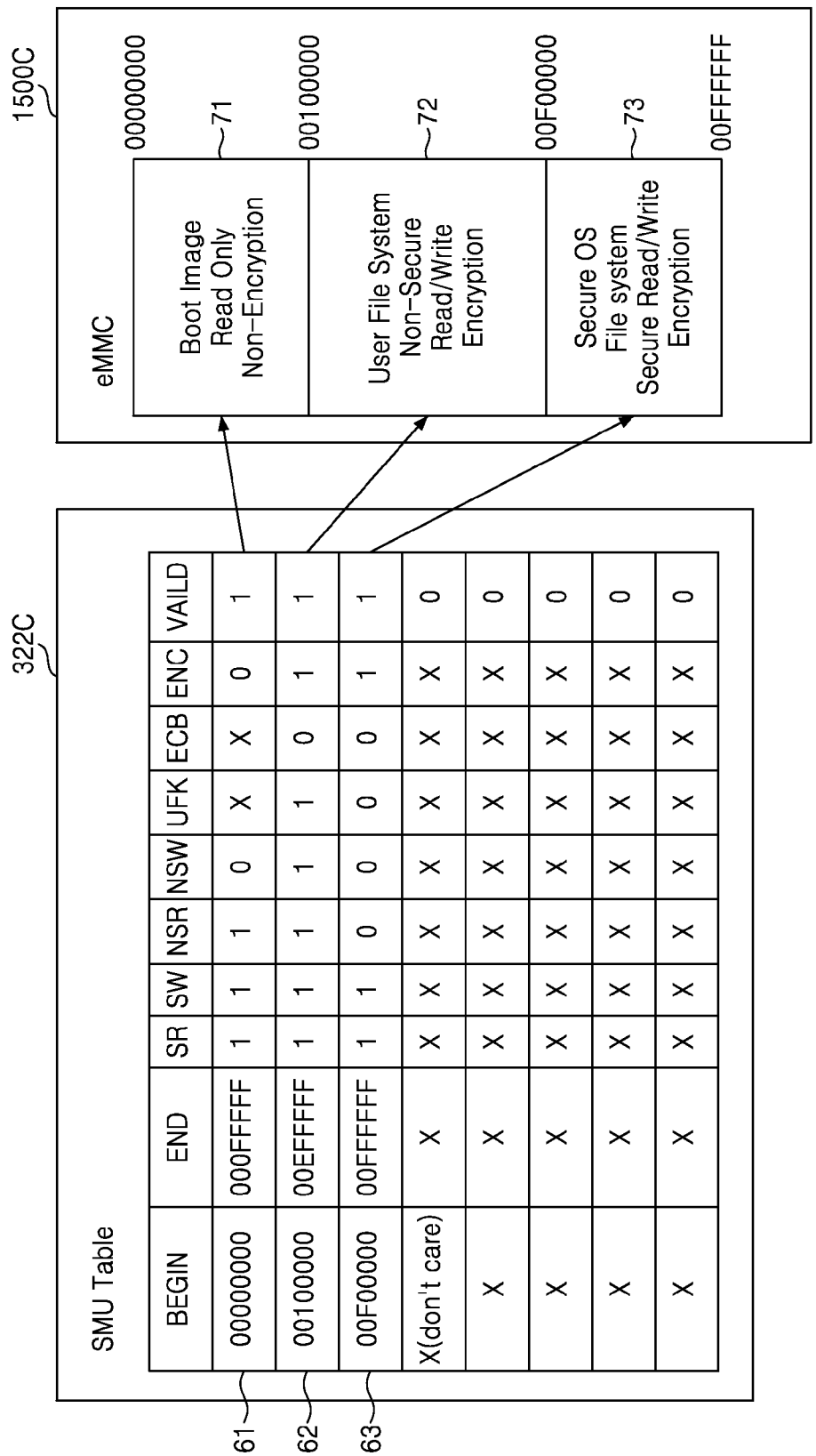
FIG. 13 is a conceptual diagram of yet another security policy table that may be included in the security management unit of FIG. 5.

Collectively FIGS. 12 and 13 serve to characterize an embedded multi-media card (eMMC) that may be used as a data storage device in certain embodiments of the inventive concept. The eMMC may be a memory card standard of a flash memory, and the eMMC is a standard of an embedded MMC which is set as a standard in JEDEC. The eMMC plays a role of storing multi-media data so as to be used in various types of digital devices beyond the limits of a hard disk or a compact disk.

FIG. 12 is a list of signals that may be stored in a security policy table when the storage device in relation to the eMMC. Referring to FIG. 12, BEGIN indicates a sector address where a partition begins; END indicates a sector address where the partition ends; SR denotes whether a read operation may be performed when the current application has a security level; SW denotes whether a write operation may be performed when the current application has a security level; NSR denotes whether a read operation may be performed when the current application has a non-security level; NSW denotes whether a write operation may be performed when the current application has a non-security level; UFK indicates whether a fuse key may be used during an encryption; ECB indicates use of an Electronic codebook (ECB) mode; ENC denotes whether an encryption operation is needed; and VALID denotes validity of a value stored in an entry of a table.

FIG. 13 illustrate another example of a security policy table that may be included in the security management unit of FIG. 5. Referring to FIGS. 12 and 13, memory space provide by an eMMC 1500C is divided into a plurality of partitions 71, 72, and 73 each having a different security policy. The security policy table 322C includes entries each managing a security policy for each of the plurality of partitions 71, 72, and 73 each included in the eMMC 1500C.

Each entry sets a start (or begin) sector address BEGIN and an end sector address END so as to express a range of the plurality of partitions 71, 72, and 73 included in the eMMC 1500C.

In addition, each entry stores information on whether a value stored in each entry of a security policy table is valid and a security policy.

The security policy may include at least one of a read operation SR at a security level for a partition corresponding to each entry, a write operation SW at a security level, a read operation NSR at a non-security level, a write operation NSW at a non-security level, an encryption mode ECB, and an encryption operation ENC of input/output data as described referring to FIG. 12.

For example, since a value of validity VALID of a first entry 61 is 1, values of the first entry 61 corresponding to a first partition 71 of the storage device 1500 are valid. A region of the first partition 71 has a range from a region corresponding to 00000000 which is a start address to a region corresponding to 000FFFFF which is an end address. The first partition 71 stores a boot program or a boot image, so that only a read operation may be performed in the first partition 71 at a non-security level. However, an encryption operation does not need to be performed on data stored in the first partition 71.

Since a value of validity VALID of a second entry 62 is 1, values of the second entry 62 corresponding to a second partition 72 of the storage device 1500 are valid. A region of the second partition 72 has a range from a region corresponding to 00100000 which is a start address to a region corresponding to 00EFFFFF which is an end address. The second partition 72 stores a User File system, so that both a read operation and a write operation may be performed in the second partition 72 at a non-security level. However, an encryption operation needs to be performed on data stored in the second partition 72.

Since a value of validity VALID of a third entry 63 is 1, values of the third entry 63 corresponding to a third partition 73 of the storage device 1500 are valid. A region of the third partition 73 has a range from a region corresponding to 00F00000 which is a start address to a region corresponding to 00FFFFFF which is an end address. The third partition 73 stores Secure OS File system, so that both a read operation and a write operation may be performed in the third partition 73 at a security level. In addition, an encryption operation needs to be performed on data stored in the third partition 73.

Figure 14:
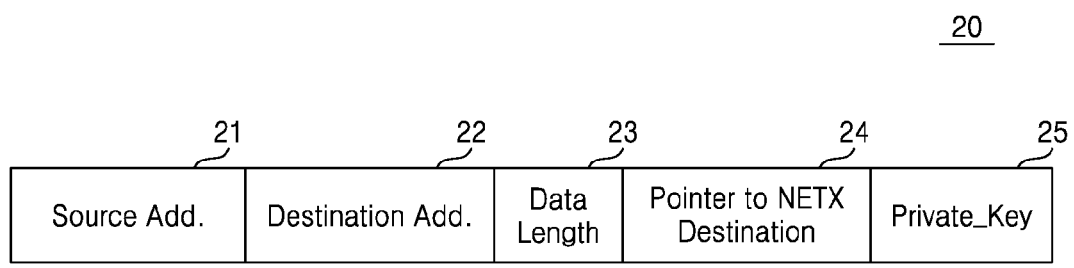
FIG. 14 is a conceptual drawing showing another example of a buffer descriptor that may be used in the computer systems of FIGS. 1 and 2.
Figure 15:
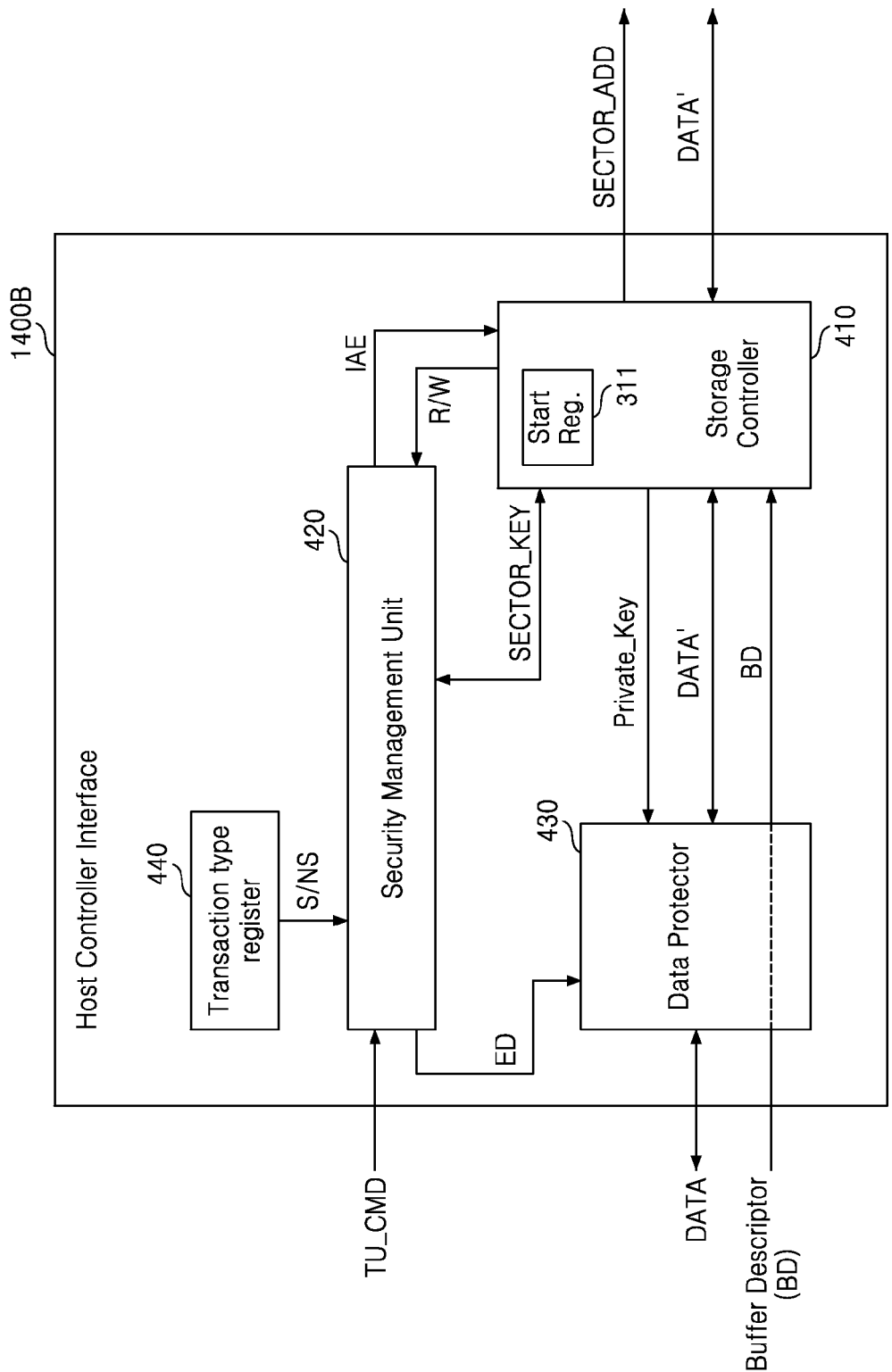
FIGS. 15, 16 and 17 are respective block diagrams illustrating other example of a host controller interface that may be used in the computer system of FIGS. 1 and 2.

FIG. 14 is a conceptual drawings illustrating another example of a buffer descriptor that may be used by certain embodiments of the inventive concept. FIG. 15 is another block diagram analogous to the block diagram of FIG. 5 according to another embodiment of the inventive concept.

Referring collectively to FIGS. 14 and 15, it is assumed that first and second applications, different from each other, are being simultaneously executed by the CPU 1100. The first application encrypts and stores first data in a first region of the storage device 1500, and the second application encrypts and stores second data in a second region of the storage device 1500.

Here, when the first data is encrypted and stored using a sector key corresponding to the first region, and the second application may perform an encryption operation or decryption operation on data using the sector key corresponding to the first region, the second application may have a program that the second application may read data which may be accessed by the first application.

To overcome this potential problem, certain embodiments of the inventive concept add a security key to the buffer descriptor so that even when a first application having permission related to "common" encryption or decoding need not have permission to read data associated with a second application.

Referring to FIGS. 1, 3 and 14, a buffer descriptor 20 is similar to that of buffer descriptor 10 previously described in relation to FIG. 3. However, a private key field 25 is added to the data structure, wherein the private key 25 may be differently generated for each application.

The host controller interface 1400A of FIG. 5 uses a sector key (SECTOR_KEY) to encrypt data (DATA) or to decrypt previously encrypted data (DATA'). However, unlike the previous embodiments described the host controller interface 1400B of FIG. 15 additionally uses the security key (Private_Key) to encrypt/decrypt data.

Referring to FIGS. 1 and 15, the host controller interface 1400B includes a storage controller 410, a security management unit (SMU) 420, a data protector 430, and a transaction type register 440.

The storage controller 410 controls data accessed to the storage device 1500. The storage controller 410 reads data from the main memory 1210 by using a source address included in a buffer descriptor BD output from the main memory 1200. Moreover, the storage controller 410 may output the private key included in the buffer descriptor BD to the data protector 430.

Sector information included in the buffer descriptor BD may be used to generate a sector address communicated to the storage device 1500 and a sector key communicated to the security management unit 420.

The security management unit 420 may select one of entries of a security policy table in response to a sector key provided by the storage controller 410, and output an encryption/decryption indication signal (ED) determining whether to perform an encryption operation on the data, or a decryption operation on the encrypted data according to a security policy indicated by the selected security policy table entry.

According to the encryption/decryption indication signal, the data protector 430 may perform an encryption/decryption operation on data to be written to or read from the storage device 1500 via the host controller interface 1400B. That is, the data protector 430 may be used to determine whether to perform an encryption operation, a decryption operation, or a bypass operation based on the encryption/decoding indication signal provided by the security management unit 420.

When an encryption operation should be performed on write data, the data protector 330 may perform an encryption operation by using the Private_Key provided by the storage controller 410.

Here, since the Private_Key is differently set or generated for each application, respective application will not know the Private_Key of another application. Accordingly, even if a first application may access data stored in the encrypted storage region 1500, a second application need not know a the Private_Key associated with the first application, despite the second application's ability to access the same encrypted storage region. This approach provides inter-application data security while making use of common data storage resources.

Figure 16:
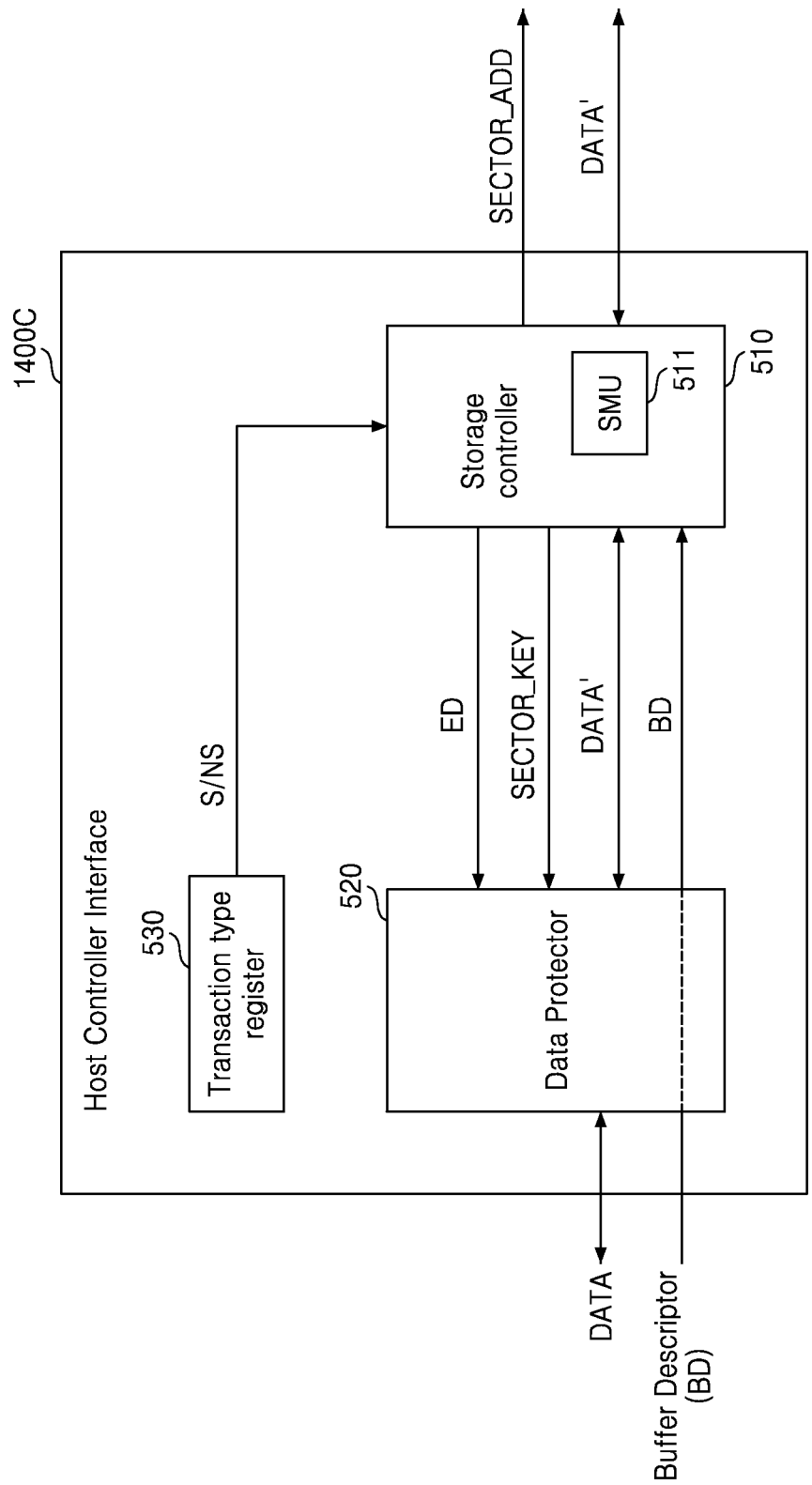
Figure 17:
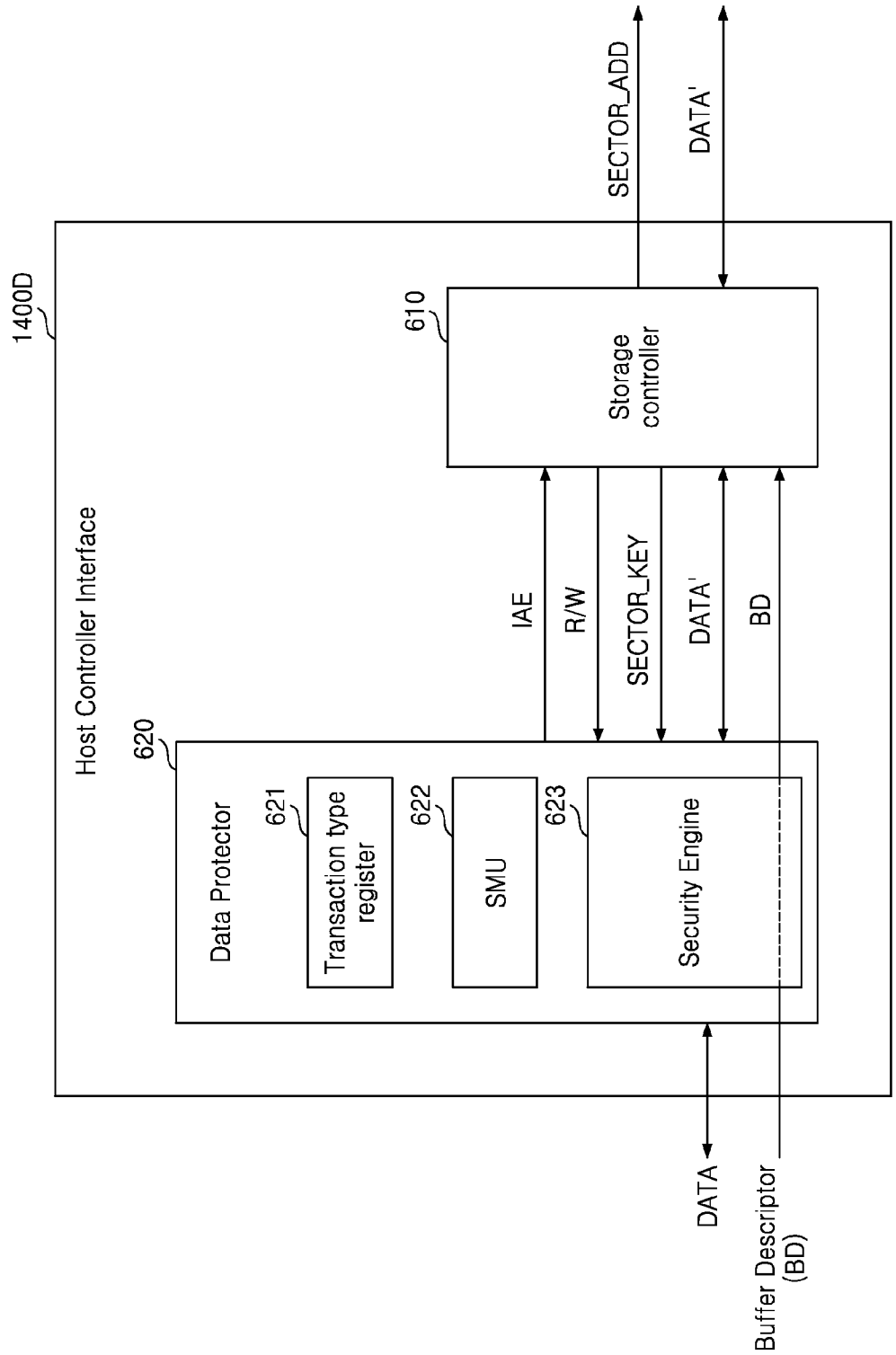

FIGS. 16 and 17 are respective block diagrams illustrating other examples of host controller interfaces that may be used in the computer system of FIG. 1. According to these embodiments, a security management unit capable of performing the same or similar function as those described in relation to the security management unit 320 of FIG. 5 may be independently stored inside the host controller interface. However, according to another embodiments, a security management unit performing the same or similar function to the security management unit 320 of FIG. 5 may be embedded in one of the storage controller or the data protector.

Referring to FIGS. 1 and 16, the host controller interface 1400C may include a storage controller 510, a data protector 520, and a transaction type register 530. The storage controller 510 may read data from the main memory 1200 by using a source address included in a buffer descriptor BD output from the main memory 1200, and output a sector key to the data protector 520 in response to sector information included in the buffer descriptor.

The storage controller 510 includes a security management unit 511 managing a security policy for each of the regions included in the storage device 1500. The security management unit 511 selects one of entries of a security policy table in response to sector information included in a buffer descriptor. The security management unit 511 may output an encryption/decryption indication signal, determining whether to encrypt data according to a security policy included in the selected entry, to the data protector 520.

A structure and a function of the security management unit 320 of FIG. 5 are substantially the same as a structure and a function of the security management unit 511 of FIG. 16. The transaction type register 530 performing a substantially same function to the transaction type register 340 stores security level information of an application generating a buffer descriptor, and transmits a security level signal to the storage controller 510. The storage controller 510 may determine whether data access for a specific region of the storage device 1500 is needed referring to the security level signal and a security policy table included in the security management unit 511.

Referring now to FIGS. 1 and 17, a host controller interface 1400D may include a storage controller 610 and a data protector 620. The data protector 620 may include a transaction type register 621, a security management unit SMU 622, and a security engine 623.

The storage controller 610 may read data from the main memory 1200 by using a source address included in a buffer descriptor output from the main memory 1200, and output a sector key to the data protector 620 in response to sector information included in the buffer descriptor. The storage controller 610 outputs an access operation signal for performing a read operation or a write operation to the data protector 620.

The data protector 620 includes a security management unit 622 managing a security policy for each of the regions included in the storage device 1500. The security management unit 622 selects one of entries of a security policy table in response to a sector key, and outputs an access indication signal to the storage controller 610 according to a security policy included in the selected entry. The storage controller 610 may control an access of data to the storage device 1500 based on the access indication signal.

Figure 18:
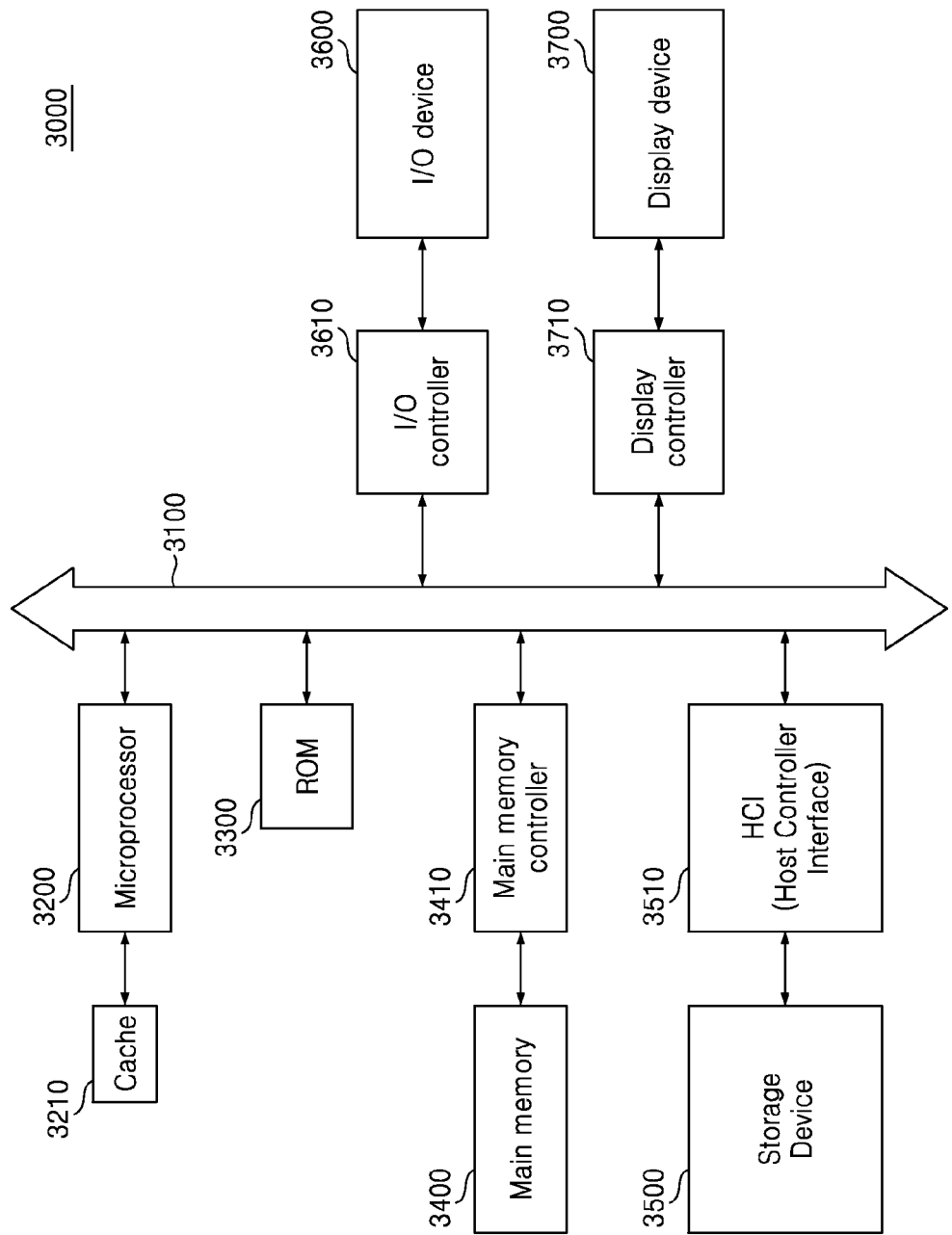
FIG. 18 is a block diagram of a computer system according to another embodiment of the inventive concept.

FIG. 18 is a block diagram illustrating a computer system according to still another embodiment of the inventive concept.

Referring to FIG. 18, a computer system 3000 may be embodied in a cellular phone, a smart phone, a personal digital assistant (PDA), a tablet personal computer, mobile internet device (MID), or a wireless communication device.

The computer system 3000 comprises a microprocessor 3200 connected to a bus 3100, a cache memory 3210, a read only memory (ROM) 3300, a main memory 3400, a main memory controller 3410, a storage device 3500, a host controller interface 3510, an I/O controller 3610, an I/O device 3600, a display device 3700, and a display controller 3710.

The microprocessor 3200 is a control device entirely controlling the computer system 3000. The microprocessor 3200 may be embodied in a multi-core processor including a plurality of cores. The cache memory 3210 is positioned adjacent to the microprocessor 3200. The cache memory 3210 is a high speed memory device used to buffer a data processing speed between the microprocessor 3200 having a comparatively fast operation speed and the main memory 3400 having a comparatively slow operation speed. The ROM 3300 may store a boot code in a read-only memory device.

The main memory 3400 performing a substantially same function to the main memory 1200 or 2200 may be embodied in a dynamic random access memory (DRAM), a static random access memory (SRAM), or a mobile DRAM. The main memory controller 3410 performing a substantially same function to the main memory controller 1300 or 2300 controls the main memory 3400.

The storage device 3500 performing a substantially same function to the storage device 1500 or 2500 may be the same as a hard disk drive (HDD), a solid state drive (SSD), or a redundant array of independent disk (RAID).

The storage device 3500 may be embodied in a non-volatile memory device, and the non-volatile memory device may include an Erasable Programmable Read-Only Memory (EPROM), an Electrically Erasable Programmable Read-Only Memory (EEPROM), a flash memory, a Phase Change Random Access Memory (PRAM), a Resistance Random Access Memory (RRAM), a Nano Floating Gate Memory (NFGM), a Polymer Random Access Memory (PoRAM), a Magnetic Random Access Memory (MRAM), or a Ferroelectric Random Access Memory (FRAM).

The host controller interface 3510 performing a substantially same function to the host controller interface 1400 or 2400 may manage a security policy by region of the storage device 3500. The security policy may manage data used in one or more application s so that the data may not be accessed by another application executed in the microprocessor 3200 when the data are sensitive data in terms of security.

The display controller 3710 controls an operation of the display device 3700. The I/O device 3700 is a device which may input/output a control signal for controlling an operation of the microprocessor 3200 or data to be processed by the microprocessor 3200, and may be embodied in a pointing device such as a touch pad and a computer mouse, a keypad, or a keyboard.

A host controller interface according to embodiments of the inventive concept may efficiently manage a different security policy according to identified regions of a storage device using a security management unit including a security policy table. Thus, a host controller interface according to embodiments of the inventive concept may continuously perform an operation using a security management unit without degradation in performance of a system caused by switching between processors even though a security policy change with particular regions of the storage device.

The host controller interface according to certain embodiments of the inventive concept may generate a private key by sectors when an application generates data, thereby preventing other applications possibly having a same data encryption/decryption authority from reading data associated with the former application already stored in the storage device.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of operating a host controller interface, the method comprising:
   receiving a buffer descriptor from a main memory, wherein the buffer descriptor, as stored in the main memory, includes a source address and sector information for data stored in a storage device;
   fetching data stored in the main memory using the source address;
   selecting an entry from a security policy table using the sector information; and
   determining whether to encrypt the fetched data using a security policy defined by the selected entry.

2. The method of claim 1, wherein the buffer descriptor is generated by an application accessing a region of the storage device indicated by the sector information.

3. The method of claim 2, further comprising:
   comparing security level information for the selected entry with security level information for an application to generate a comparison result; and
   determining whether to write data in the region of the storage device indicated by the sector information in response to the comparison result.

4. The method of claim 2, further comprising:
   comparing access operation information for the selected entry with input/output operation information for the fetched data to generate a comparison result; and
   determining whether to write the data in the region of the storage device indicated by the sector information in response to the comparison result.

5. The method of claim 1, wherein the security policy table is stored in the main memory.

6. The method of claim 1, wherein the buffer descriptor comprises the source address, a destination address, and a data length.

7. The method of claim 6, wherein the buffer descriptor further comprises a private key, and the method further comprises encrypting the fetched data using the private key.

8. A security management unit configured for use within a computer system including a main memory to control access to data stored in a storage device, the security management unit comprising:
   a security policy table storing first and second entries that respectively define first and second security policies for first and second regions of the storage device; and
   sector access control logic configured to select between the first and second entries in response to sector information included in a buffer descriptor received in the security management unit from the main memory, and provide a first control signal indicating whether to encrypt data according to the first security policy or the second security policy.

9. The security management unit of claim 8, further comprising:
   table access control logic configured to change between the first and second security policies in response to a table update command provided by a secure central processing unit (CPU) of the computer system.

10. The security management unit of claim 8, wherein each one of the first and second security policies includes at least one of security level information and access operation information.

11. The security management unit of claim 10, wherein the sector access control logic is further configured to receive sector information and a security level signal, compare the security level information for the selected entry with security level information for a current application, and provide a second control signal allowing access to the region of the storage device.

12. The security management unit of claim 10, wherein the sector access control logic is further configured to receive sector information and an access operation signal, compare access operation information for the selected entry with data access operation information, and provide a second control signal allowing access to the region of the storage device.

13. The security management unit of claim 8, wherein the security management unit is configured within a host controller interface of the computer system.

14. A host controller interface for a computer system including a Central Processing Unit (CPU) that executes an application, and a main memory controller that accesses data stored in a main memory, the host controller interface comprising:
   a storage controller that reads data from the main memory using a source address included in a buffer descriptor generated by execution of the application, stored in the main memory, and provided from the main memory to the host controller interface, wherein the storage controller provides a sector key in response to sector information;
   a security management unit that selects an entry from a security policy table in response to the sector key and provides a first control signal defining a security policy corresponding to the selected entry; and
   a data protector that determines whether to perform an encryption operation on data read from a storage device in response to the first control signal,
   wherein the security policy table includes a plurality of entries, each entry respectively defining a corresponding security policy for at least one of a plurality of regions in the storage device.

15. The host controller interface of claim 14, wherein the data protector performs the encryption operation in response to the first control signal and the sector key.

16. The host controller interface of claim 14, wherein the data protector performs the encryption operation in response to the first control signal and a private key included in the buffer descriptor.

17. The host controller interface of claim 14, further comprising:
   a transaction type register that stores security level information for the application generating the buffer descriptor, and providing a security level signal indicating security level information to the security management unit.

18. The host controller interface of claim 17, wherein the security management unit receives the sector information and the security level signal, compares security level information included in the selected entry with the security level signal, and outputs a second control signal indicating whether to allow an access to a specific region of the storage device according to a result of the comparison.

19. The host controller interface of claim 17, wherein the security management unit receives the sector information and an access operation signal output from the storage controller, compares access operation information included in the selected entry with data access operation information, and outputs a second control signal indicating whether to allow an access to a specific region of the storage device according to a result of the comparison.

20. A computer system comprising:
   a storage device that includes a plurality of regions;
   a central processing unit (CPU) that generates a buffer descriptor while executing an application accessing a region among the plurality of regions;
   a main memory that stores the buffer descriptor and data; and
   a host controller interface that reads the data from the main memory using a source address included in the buffer descriptor, selects one of a plurality of entries from a security policy table in response to sector information, and determines whether to perform an encryption operation on the data based on a security policy defined by the selected entry,
   wherein each of the plurality of entries stored in the security policy table manages a different security policy for each of the plurality of regions in the storage device.

21. The computer system of claim 20, wherein the host controller interface includes:
   a storage controller that reads the data from the main memory using the source address, and provides a sector key in response to the sector information;
   a security management unit that selects the selected entry in response to the sector key and provides a first control signal in response to a security policy defined by the selected entry; and
   a data protector that determines whether to perform an encryption operation on the data read from the storage device based on the first control signal.

22. The computer system of claim 20, wherein the storage device is one of a hard disk drive (HDD), a compact disk, a solid state drive (SSD), a multi-media card (MMC), an embedded MMC (eMMC), and a universal flash storage (UFS).

23. The computer system of claim 20, wherein the storage device and the host controller interface communicate via a serial ATA interface.

* * * * *